United States Patent
Melody et al.

[11] Patent Number: 5,853,794
[45] Date of Patent: Dec. 29, 1998

[54] DOPED POLYANILINE SOLUTIONS

[75] Inventors: Brian J. Melody, Greenville; John T. Kinard; Philip M. Lessner, both of Simpsonville, all of S.C.

[73] Assignee: Kemet Electronics Corp., Greenville, S.C.

[21] Appl. No.: 962,059

[22] Filed: Oct. 31, 1997

[51] Int. Cl.[6] .............................. H01B 1/20; B05D 5/12; B05D 7/14
[52] U.S. Cl. .............................. 427/58; 427/80; 427/221; 427/388.1; 252/500
[58] Field of Search .................................. 427/58, 79, 80, 427/331, 388.1; 252/500

[56] References Cited

U.S. PATENT DOCUMENTS

| | | | |
|---|---|---|---|
| 4,762,644 | 8/1988 | Kobayashi et al. | 252/500 |
| 5,069,820 | 12/1991 | Jen et al. | 252/500 |
| 5,114,610 | 5/1992 | Jenekhe et al. | 252/182.33 |
| 5,264,552 | 11/1993 | Abe et al. | 528/422 |
| 5,324,453 | 6/1994 | Cao et al. | 252/500 |
| 5,436,796 | 7/1995 | Abe et al. | 361/525 |
| 5,540,862 | 7/1996 | Cao et al. | 252/500 |
| 5,567,356 | 10/1996 | Kinlen | 252/500 |
| 5,574,131 | 11/1996 | Oka | 528/422 |
| 5,658,649 | 8/1997 | Wrobleski et al. | 428/213 |

FOREIGN PATENT DOCUMENTS

| | | | |
|---|---|---|---|
| 08295746 | 11/1996 | Japan. | |
| 2 168 383 A | 12/1985 | United Kingdom | C25D 11/02 |

OTHER PUBLICATIONS

Oh et al "Preparation and properties of electrically conductive polyaniline . . . " Polym. J. 29(5) 404–409 (Abstract Only), 1997.

Monsanto–Experimental Product Data Sheet XICP–OS01 (GRO)–600003B–7/96 no date.

Monsanto–Experimental Product Data Sheet XICP–OS01 no date.

*Primary Examiner*—Mark Kopec
*Attorney, Agent, or Firm*—Banner & Witcoff, Ltd.

[57] ABSTRACT

Acid-doped, polyaniline-based polymers are formed into fibers, films, and coatings with a solvent of N-ethylpyrrolidone. Such a solvent system is particularly useful for the formation of a solid electrolyte on a capacitive element.

8 Claims, No Drawings

DOPED POLYANILINE SOLUTIONS

FIELD OF THE INVENTION

The invention relates to doped polyaniline solutions, solvent systems used therein, and conductive articles formed therefrom.

BACKGROUND OF THE INVENTION

Acid-doped polyaniline is finding an increasing level of interest as a solid electrolyte for capacitors and other electronics devices. The dopants are selected from a relatively small group of acids that enhance solubility in organic solvents with a low dielectric constant, e.g., a dielectric constant of less than about 17. Acid-doped polyaniline polymers are generally considered to have no practical solubility in solvents with a dielectric constant of greater than about 17. See U.S. Pat. No. 5,567,356. The most preferred polyaniline dopant is dinonyl naphthalene sulfonic acid (DNSA).

A commercially available solution contains DNSA-doped polyaniline in a solvent mixture containing xylene, ethylene glycol monobutyl ether. Unfortunately, this solvent system is characterized by toxicity, an objectionable odor, and a solvency for inorganic salts that is sufficiently low to preclude use of the solvent for co-depositing such salts with the polymer.

It would be useful to have a solvent system that exhibited a low vapor pressure and a low toxicity.

It would be even more beneficial to have a solvent system that also had a relatively high boiling point and a relatively high dielectric constant. The higher boiling point would facilitate the use and handling of the solvent in a commercial setting. A higher dielectric constant would increase the conductivity to a point that was similar to systems using polar solvent salt systems and would be useful for some types of capacitors where an electrically conductive residue remained after solvent evaporation.

Enhanced systems for forming polyaniline-based polymer films and coatings would be particularly useful in the manufacture of capacitors. In such articles, one or more coatings of electrically conductive polyaniline-based polymer can be used as a solid electrolyte between the dielectric oxide layer and the electrodes. It would be useful to have a polyaniline-based polymer dissolution system that did not pose the problems and limitations of the former xylene solvent systems.

SUMMARY OF THE INVENTION

It is an objective of the invention to provide a process for depositing a coating or film of polyaniline from a solution that uses a solvent characterized by a lower toxicity, lower vapor pressure, higher solvency for inorganic salts, higher boiling point, and higher dielectric constant than xylene-based solvent systems used previously.

In accordance with this and other objectives of the invention that will become apparent from the description herein, a process, coating, and coated article according to the invention are based on the use of a solvent system that use N-ethyl-pyrrolidone as the solvent for acid-doped polyaniline-based polymers. This solvent is characterized by the desired lower toxicity, lower vapor pressure, higher solvency for inorganic salts, higher boiling point, and higher dielectric constant than xylene-based solvent systems.

DETAILED DESCRIPTION

Acid-doped polayaniline-based polymer is dissolved in N-ethyl-pyrrolidone solvent and used to form conductive articles. Such articles include fibers, films, coatings (particularly coatings for dissipating static electricity), coated articles, batteries, electrolytic sensors, and capacitive elements. One coated article of particular interest is a capacitive element that uses an acid-doped polyaniline-based polymer as a solid or liquid electrolyte. The anode body of such a capacitor is preferably made of a valve metal like aluminum or tantalum, with tantalum being generally more preferred between the two.

The polyaniline-based polymers applicable for the present invention are generally described in U.S. Pat. No. 5,069,820 the disclosure of which is herein incorporated by reference. The '820 patent describes electrically conductive, polyaniline-based polymers having the following general formula:

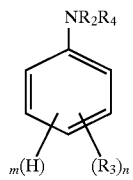

wherein:
n is an integer from 0 to 5;
m is an integer from 0 to 5 with the proviso that the sum of n and m is equal to 5;
R2 and R4 are the same or different and are hydrogen or alkyl of 1–10 carbon atoms;
R3 is the same or different and is selected from alkyl, alkenyl, alkoxy, cycloalkoxy, cycloalkenyl, alkanoyl, alkylthio; alkylamino, aryloxy, alkylthioalkyl, alkylaryl, arylalkyl, amino, dialkylamino, aryl, aryloxyalkyl, alkylsulfinylalkyl, alkylsulfonyl, arylsulfonyl, carboxylic acid, halogen, cyano, sulfonic acid, nitro, alkylsilane, or alkyl substituted with one or more of sulfonic acid, carboxylic acid, halo, nitro, cyano, or epoxy moieties; or any two R3 groups taken together may form an alkylene or alkylene chain completing a 3, 4, 5, 6, or 7-membered aromatic or acyclic ring that may include one or more divalent nitrogen, sulfur, sulfinyl, ester, carbonyl, sulfonyl, or oxygen atoms; R3 is an aliphatic moiety having repeat units of either of the formula:

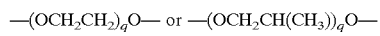

—(OCH$_2$CH$_2$)$_q$O— or —(OCH$_2$CH(CH$_3$))$_q$O— wherein q is a positive whole number.

The acid dopants used for the polyaniline-based polymers are generally selected from anions of sulfonic acids (e.g., dinonyl naphthalene sulfonic acid (DNSA), toluenesulfonic acid, dodecylbenzine sulfonic acid, camphor sulfonic acid, allylsulfonic acid, 1-propanesulfonic acid, 1-butananesulfonic acid, 1-hexanesulfonic acid, 1-heptanesulfonic acid, benzenesulfonic acid, styrenesulfonic acid, naphthalenesulfonic acid, including homologs and analogs thereof), and carboxylic acids (e.g., acetic acid and oxalic acid). The preferred organic sulfonic acid dopants includes toluenesulfonic acid, dodecylbenzine sulfonic acid, and camphor sulfonic acid.

The primary solvent useful in the present invention is N-ethylpyrrolidone. This solvent is characterized by a high dielectric constant (about 28), high solution conductivity, the ability to wet substrates that are otherwise difficult to wet, and a freezing point of about −70° C. The high dielectric constant suggests that the solvent should be able to dissolve salts for co-deposition with the polyaniline-based polymer.

The solvent of the invention allows polyaniline-based polymer solutions to be made at a variety of concentrations from 0.01–35 wt % with stirring and heating of 80°–85° C. at the higher concentrations. The more commercially useful concentrations for thorough impregnation and coating of porous substrates is a solution having from about 10 wt % to about 20 wt % polyaniline-based polymer. Such solution concentrations are comparable to those commercially available with xylene-based solvent systems.

The polyaniline polymer solution of the present invention is particularly suitable in the manufacture of capacitive elements that use an electrically conductive, acid-doped polyaniline polymer as an electrolyte. Such capacitive elements are made from valve metal powders that are anodized to form a dielectric layer on the surface of the anode body, coated with an electrically conductive polymer to form an electrolyte layer, reformed, coated/reformed until the desired electrolyte thickness is achieved, and finished. Liquid electrolytes are generally preferred for high voltage capacitive elements.

The valve metals from which the capacitive elements are formed preferably are made of materials that form an insulating film when the body is positively charged. When the body is negatively charged, the film will conduct. Suitable materials include the Group IV and V metals (particularly niobium, tantalum, zirconium, and titanium) and aluminum. When powdered, appropriate powder sizes are within the range of 0.05 to 50 microns. These powders are pressed with or without a binder to form a green anode body having a density of about 30–70% theoretical density. The green body is then sintered at a temperature within the range from about 1200° C. to about 1800° C. Aluminum is preferably used in the form of a foil or etched foil that is either rolled or stacked.

The anode is then "anodized" by suspending the sintered body in an electrolyte solution at a formation voltage of 3–4 times the rated voltage of the element. For example, a typical part rated at 10 volts would be formed at 30–40 volts, usually 35 volts. Suitable electrolyte solutions include phosphoric acid or ammonium nitrate in water with or without thickening agents, solvents, co-solvents, surfactants, or other conventional additives.

Once anodized, the anode is coated with one or more layers of an electrically conductive, acid-doped polyaniline-based polymer by immersing the capacitive element in a solution containing the polymer in the solvent. The coated element is then heated to drive off the solvent. Suitable heating temperatures are within the range from about 35° C. to about 120° C.

The polymer-coated capacitive element is then "reformed" by immersing the element in an acidic reforming solution. After heating, there may be residual monomer or by-product materials that are undesirable in the final capacitive element. Such materials are readily removed by washing with water, solvents, and/or surfactants. Preferred washing agents include methanol or acetone.

The thickness of the electrolyte layer can be increased by repeated the above process steps until an adequate thickness is achieved. In general, the polymeric coating can be built up with 1–20 repetitions of the impregnation, heating, and washing steps.

The reformed capacitive element is then finished to make a stock part. Finishing would typically entail an outer coating of the undoped solid electrolyte polymer, imprinting the element with an electrode pattern, sealing the unit in a nonconductive material, e.g., epoxy, and forming a multi-element assembly (if desired).

EXAMPLES

Example 1

A 25% solution containing 10 grams of DNSA-doped polyaniline is prepared by dissolving polyaniline in an 80° C. solution of N.E.P.™ (International Specialty Chemicals Corp.), a commercially available product of N-ethyl-2-pyrrolidone. The solution has a dielectric constant of 28.1. Resistivity measurements were made at 1 kHz with a Y.S.I. conductivity cell (cell constant=1.0) and are reported in Table 1.

TABLE 1

| TEMPERATURE (°C.) | RESISTIVITY (OHM-CM) |
|---|---|
| −35 | 8350 |
| 20 | 2070 |
| 80 | 1000 |

The conductivity of this solution is similar to that of a polar solvent salt solution.

We claim:

1. A process for forming a polymeric film by the steps comprising:

applying to an article a solution comprising an acid-doped polyaniline polymer dissolved in a solvent comprising N-ethylpyrrolidone; and allowing said solvent to evaporate.

2. A process according to claim 1 wherein said article is a capacitive element.

3. A process according to claim 2 wherein said capacitive element is made of a valve metal.

4. A process according to claim 3 wherein said valve metal is tantalum.

5. A process according to claim 1 wherein said article is a metal surface.

6. A process according to claim 1 wherein said acid-doped polyaniline polymer is a sulfonic acid-doped polyaniline polymer.

7. A process according to claim 6 wherein said acid-doped polyaniline polymer is a dinonyl naphthalene sulfonic acid-doped polyaniline polymer.

8. A process according to claim 1 further comprising:

washing the polymer coating with either acetone or methanol.

* * * * *